UNITED STATES PATENT OFFICE.

PHILIP VANDENBURGH, OF CLEVELAND, OHIO.

PROCESS OF MAKING DRY ADHESIVE PASTE.

SPECIFICATION forming part of Letters Patent No. 521,517, dated June 19, 1894.

Application filed February 15, 1894. Serial No. 500,274. (No specimens.)

*To all whom it may concern:*

Be it known that I, PHILIP VANDENBURGH, a citizen of the United States, residing at Cleveland, in the county of Cuyahoga and State of Ohio, have invented certain new and useful Improvements in Processes of Making Dry Adhesive Paste; and I do hereby declare the following to be a full, clear, and exact description of the invention, such as will enable others skilled in the art to which it appertains to practice the same.

My invention relates to the process of making dry flour paste. Pulverized dry flour paste is an old article of manufacture; and the advantages of this form of flour paste as a commercial article are too well known to call for any enumeration thereof from me.

My invention is an improvement in the process of making the same, which I believe results in a better article, at a lessened cost.

In the manufacture of dry paste by my improved process I first mix flour and water together, forming a thick batter or thin dough. This dough is then allowed to ferment, preferably for about twenty-four hours, in a temperature of about 110°. When the dough shall have fermented sufficiently it will be very sour, and all or nearly all of the albuminous constituents of the flour will be decomposed; at this time the dough will have swelled until it is approximately double its original bulk. If desired, the fermentation may be hastened by the addition of yeast or other artificial ferment, but in any case the fermentation must be continued until the dough is in the described condition. When the dough is sufficiently fermented and before the mass begins to decrease in bulk it is placed in pans and cooked at a low temperature,—preferably by steam heat until it takes on a light brownish color. The cooked product is then thoroughly dried,—all of the moisture being evaporated therefrom. The cooked and dried product is then ground to a fine powder,—this powder being an article which may be kept an indefinite period,—and from which may be formed, by the admixture therewith of a suitable quantity of water, a paste having strong adhesive properties. It is also believed that this paste powder may be kept longer without deterioration or becoming spoiled than any paste heretofore manufactured; and it is believed that this is due to the fact that the dough is fermented as described before it is cooked.

Having described my invention, I claim—

The process of making a dry paste which consists (first) in mixing flour and water to make a dough, (second) fermenting said dough, until it is sour and most of its albuminous constituents are decomposed (third) cooking the fermented dough by a low heat and then evaporating the moisture therefrom, and (fourth) pulverizing the resulting product, substantially as and for the purpose specified.

In testimony whereof I affix my signature in presence of two witnesses.

PHILIP VANDENBURGH.

Witnesses:
 E. L. THURSTON,
 C. S. BRITTON.